(12) United States Patent
Kim et al.

(10) Patent No.: US 11,138,844 B2
(45) Date of Patent: Oct. 5, 2021

(54) ARTIFICIAL INTELLIGENCE APPARATUS AND METHOD FOR DETECTING THEFT AND TRACING IOT DEVICE USING SAME

(71) Applicant: LG ELECTRONICS INC., Seoul (KR)

(72) Inventors: Yoonkyum Kim, Seoul (KR); Jongjin Park, Seoul (KR); Hanho Lee, Seoul (KR); Yoonseok Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 16/593,043

(22) Filed: Oct. 4, 2019

(65) Prior Publication Data

US 2020/0035076 A1 Jan. 30, 2020

(30) Foreign Application Priority Data

Aug. 27, 2019 (KR) .......... 10-2019-0105205

(51) Int. Cl.
*G08B 13/14* (2006.01)
*G08B 13/196* (2006.01)
*H04W 4/029* (2018.01)
*G06T 7/20* (2017.01)

(52) U.S. Cl.
CPC .......... *G08B 13/19608* (2013.01); *G06T 7/20* (2013.01); *G08B 13/19684* (2013.01); *H04W 4/029* (2018.02)

(58) Field of Classification Search
CPC ........ G08B 13/19608; G08B 13/19684; G08B 13/14; G08B 13/1427; G08B 13/1436; G08B 3/10; G08B 25/10; H04W 4/029; H04W 4/70; H04W 88/02; G06T 7/20; B60R 25/102; B60R 25/104; B60R 25/1003; B60R 25/1004
USPC .............. 340/568.1, 426.12, 426.18, 426.19, 340/539.13, 539.23
See application file for complete search history.

(56) References Cited

U.S. PATENT DOCUMENTS

| | | | |
|---|---|---|---|
| 2013/0214917 A1* | 8/2013 | Chung | B60R 25/1004 340/426.19 |
| 2018/0270734 A1* | 9/2018 | Kalidoss | H04W 40/246 |
| 2019/0057586 A1* | 2/2019 | Kangralkar | H04W 4/029 |
| 2019/0092283 A1* | 3/2019 | Kristinsson | H04W 12/0609 |
| 2020/0057163 A1* | 2/2020 | Bromberg | H04B 7/0632 |
| 2020/0172050 A1* | 6/2020 | Schwarz | B60R 25/102 |
| 2020/0228925 A1* | 7/2020 | Baird | H04W 76/14 |

* cited by examiner

*Primary Examiner* — Anh V La
(74) *Attorney, Agent, or Firm* — Birch, Stewart, Kolasch & Birch, LLP

(57) ABSTRACT

An artificial intelligence apparatus is provided. The artificial intelligence apparatus includes: a communication interface configured to receive status information from an IoT device; and a processor configured to detect whether the IoT device is stolen based on the received state information, acquire position information of the IoT device when theft of the IoT device is detected, control the communication interface to transmit the acquired position information to a mobile terminal, receive a theft process execution command request of the IoT device from the mobile terminal, and transmit a theft process execution command corresponding to the received theft process execution request to the IoT device.

5 Claims, 9 Drawing Sheets

ARTIFICIAL INTELLIGENCE APPARATUS AND METHOD FOR DETECTING THEFT AND TRACING IOT DEVICE USING SAME

CROSS-REFERENCE TO RELATED APPLICATIONS

The present application claims priority under 35 U.S.C. 119 and 35 U.S.C. 365 to Korean Patent Application No. 10-2019-0105205 (filed on Aug. 27, 2019), which is hereby incorporated by reference in its entirety.

FIELD

The present disclosure relates to an artificial intelligence apparatus and a method for detecting theft and tracing IoT device using the same, and more particularly, to an artificial intelligence apparatus for a theft detection and a trace of an Internet of Things (IoT) device.

BACKGROUND

Recently, as IoT technology develops, various devices to which the IoT technology is applied, and various services using the devices have been released.

In particular, services, which use IoT devices applied with the IoT technology by multiple users together, have been actively appearing based on a sharing economy concept, and thus the competition has been intensifying.

Providers of the services merely perform a management of the IoT devices and place the IoT devices in various places without directly occupying or storing the IoT devices to allow users to use the IoT devices freely.

However, since the providers do not occupy or store the IoT devices directly, it may be vulnerable to theft, and business may be interrupted when retrievals of stolen IoT devices are not smoothly performed.

SUMMARY

Embodiments provide an artificial intelligence apparatus for detecting theft of an IoT device and supporting a trace of a stolen IoT device.

The artificial intelligence apparatus according to the embodiments includes: a communication interface configured to receive status information from an IoT device; and a processor configured to detect whether the IoT device is stolen based on the received state information, acquire position information of the IoT device when theft of the IoT device is detected, control the communication interface to transmit the acquired position information to a mobile terminal, receive a theft process execution command request of the IoT device from the mobile terminal, and transmit a theft process execution command corresponding to the received theft process execution request to the IoT device.

According to the embodiments, the artificial intelligence apparatus further includes a memory configured to store a recognition model that recognizes whether the IoT device is normally used based on state information of the IoT device, and the processor may recognize whether the IoT device is stolen based on the received state information, by using the recognition model.

According to the embodiments, the artificial intelligence apparatus may further include a learning processor configured to update the recognition model by using the state information of the IoT device and a recognition result of the recognition model.

According to the embodiments, when theft of the IoT device is detected, the processor may receive the position information acquired by a position information receiver of the IoT device from the IoT device.

According to the embodiments, when theft of the IoT device is detected, the processor may receive position information of the IoT device acquired by a Wi-Fi positioning system (WPS), from the IoT device or a WPS server.

According to the embodiments, the processor may detect a distance between the IoT device and the mobile terminal based on the position information of the IoT device and position information of the mobile terminal, and automatically transmit the theft process execution command to the IoT device when the detected distance is within a reference distance.

According to the embodiments, the theft process may include at least one of outputting a wireless communication signal through a communication interface of the IoT device or outputting a sound signal through a speaker of the IoT device.

According to the embodiments, the state information may include at least one of a use/non-use state of the IoT device, a battery state, a position, or a sensing value obtained by a sensor unit.

According to the embodiments, the processor may receive a theft process end request from the mobile terminal, and transmit a theft process end command corresponding to the received theft process end request to the IoT device.

The artificial intelligence apparatus according to one embodiment includes: a communication interface configured to acquire position information of the artificial intelligence apparatus; at least one sensor configured to acquire state information of the artificial intelligence apparatus; a speaker; and a processor configured to detect whether the artificial intelligence apparatus is stolen based on the acquired state information, transmit the position information of the artificial intelligence apparatus to a server when theft of the artificial intelligence apparatus is detected, receive a theft process execution command from the server, control at least one of the communication interface or the speaker, based on the received theft process execution command, to output at least one of a wireless communication signal or a sound signal.

According to the embodiments, the at least one sensor includes a movement sensor, and the processor may detect theft of the artificial intelligence apparatus when a movement more than a reference time is detected through the movement sensor in a state where the artificial intelligence apparatus is not in use.

According to the embodiments, the communication interface includes a Wi-Fi module, and the processor may switch a mode of the Wi-Fi module into a softAP mode to broadcast the wireless communication signal in response to the theft process execution command.

According to the embodiments, the communication interface includes a short range wireless communication module, and the processor may switch a mode of the short range wireless communication module into an advertise mode to broadcast the wireless communication signal in response to the theft process execution command.

The method for detecting theft of an IoT device and tracing the IoT device using an artificial intelligence apparatus according to the embodiments includes: detecting whether the IoT device is stolen based on state information of the IoT device; acquiring position information of the IoT device when theft of the IoT device is detected; transmitting the acquired position information to a mobile terminal; and outputting a theft signal through the IoT device based on a theft process execution command The details of one or more embodiments are set forth in the accompanying drawings and the description below. Other features will be apparent from the description and drawings, and from the claims.

DETAILED DESCRIPTION OF THE EMBODIMENTS

Figure 1:
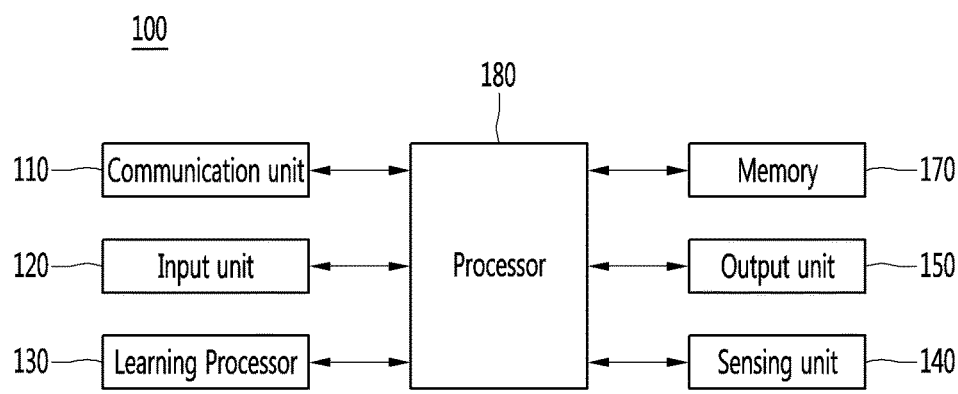
FIG. 1 illustrates an AI apparatus according to one embodiment.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI apparatus 100 according to an embodiment of the present invention.

The AI apparatus 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, learning data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
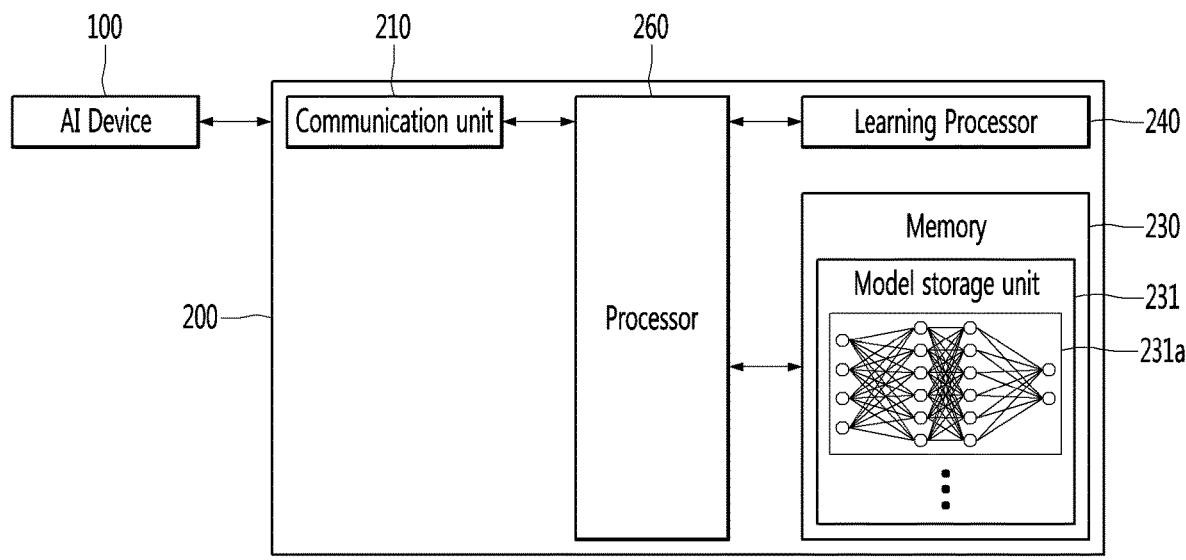
FIG. 2 illustrates an AI server according to one embodiment.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
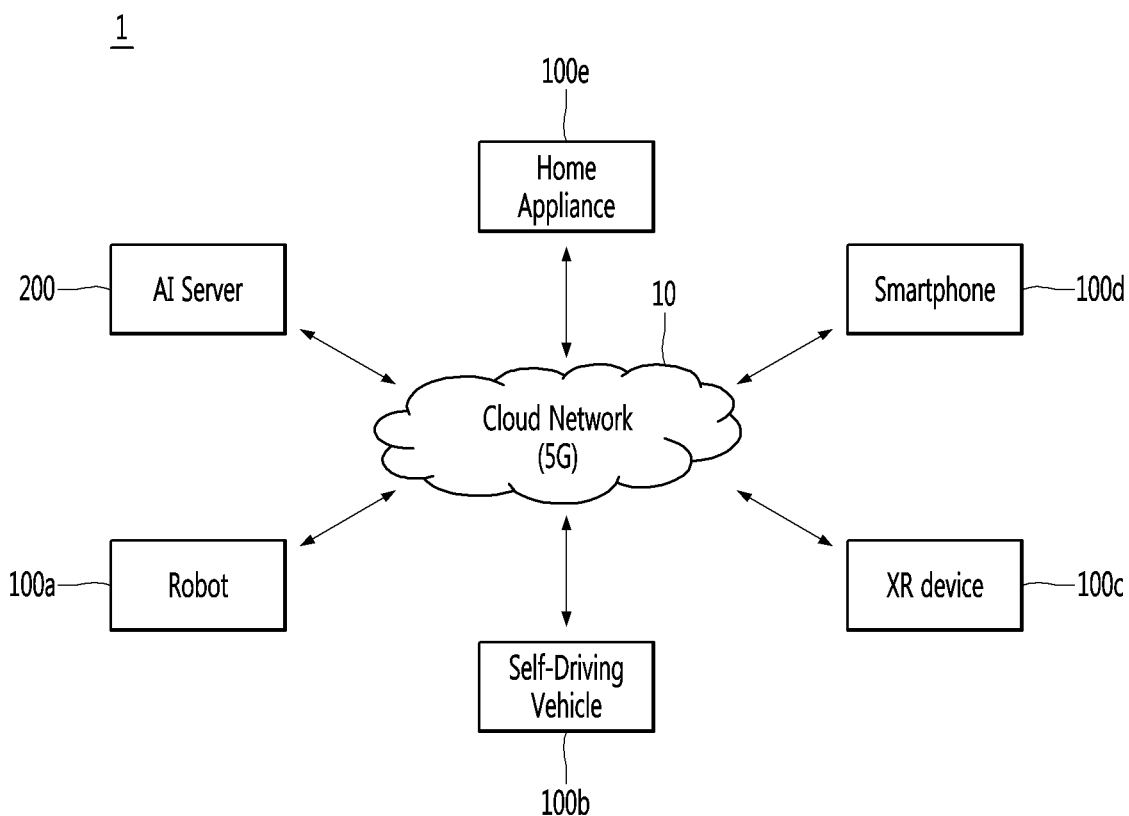
FIG. 3 illustrates an AI system according to one embodiment.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
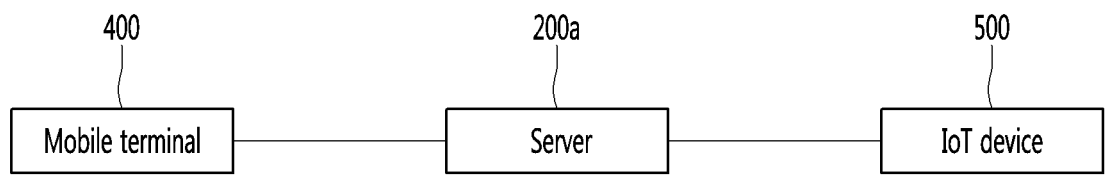
FIG. 4 a view showing an example of a system including an artificial intelligence apparatus according to one embodiment.

FIG. 4 is a view showing an example of a system including an artificial intelligence apparatus according to one embodiment.

Referring to FIG. 4, the system according to the embodiments may include a server 200a, a mobile terminal 400, and an IoT device 500.

Hereinafter, the artificial intelligence apparatus may be the server 200a. However, according to embodiments, the artificial intelligence apparatus may be the IoT device 500 or the mobile terminal 400.

Meanwhile, the server 200a may be an example of the AI server 200 shown in FIG. 2, and the mobile terminal 400 and the IoT device 500 may be examples of the artificial intelligence apparatus 100 shown in FIG. 1.

The server 200a may perform overall management operations of the IoT device 500. The server 200a may periodically acquire state information from each IoT device 500 to manage the at least one IoT device 500. In addition, the server 200a may transmit a control command to manage at least one IoT device 500.

The state information may include information related to a used/non-used state of the IoT device 500, information related to a battery state, position information, various sensing information, and/or authentication information.

Meanwhile, the server 200a may acquire information related to a use pattern of the IoT device 500 based on the state information received from the IoT device 500, and may detect whether the IoT device 500 is stolen based on the acquired use pattern and the received state information.

According to the embodiments, the server 200a may learn a use pattern based on the state information by using an artificial intelligence-based neural network. The server 200a may input the received state information as a learning model generated based on a learning result, so as to recognize whether the IoT device is in normal use or abnormal use such as theft. This will be described in more detail later with reference to FIGS. 11 and 12.

The mobile terminal 400 may be a manager terminal of a service provided through the IoT device 500 or may be a user terminal of the service.

The mobile terminal 400 may include various electronic devices such as a smart phone, a tablet PC, and a wearable device.

For example, when the mobile terminal 400 is the user terminal, the mobile terminal 400 may provide various functions for using the service through an application related to the service.

Meanwhile, when the mobile terminal 400 is the manager terminal, the manager may perform management operations such as checking states of the IoT devices 500 through the mobile terminal 400.

According to the embodiments, when there is a theft-detected IoT device 500, the mobile terminal 400 may acquire approximate position information of the stolen IoT device 500 from the server 200a. When the mobile terminal 400 is within a predetermined distance from the IoT device 500, the mobile terminal 400 may estimate a position of the IoT device 500 by receiving a communication signal outputted from the IoT device 500. The related embodiment will be described in more detail later with reference to FIGS. 6 to 10.

The IoT device 500 may be implemented as various devices that support wireless communication. For example, the IoT device 500 may include a transportation vehicle such as an electric scooter shared by users. The IoT device 500 may periodically transmit state information to the server 200a through the wireless communication.

According to the embodiments, the IoT device 500 may detect the theft using a sensor provided in the device. When the theft is detected, the IoT device 500 may transmit information indicating that the theft is detected to the server 200a, and the server 200a may recognize that the IoT device 500 is stolen based on the received information.

Figure 5:
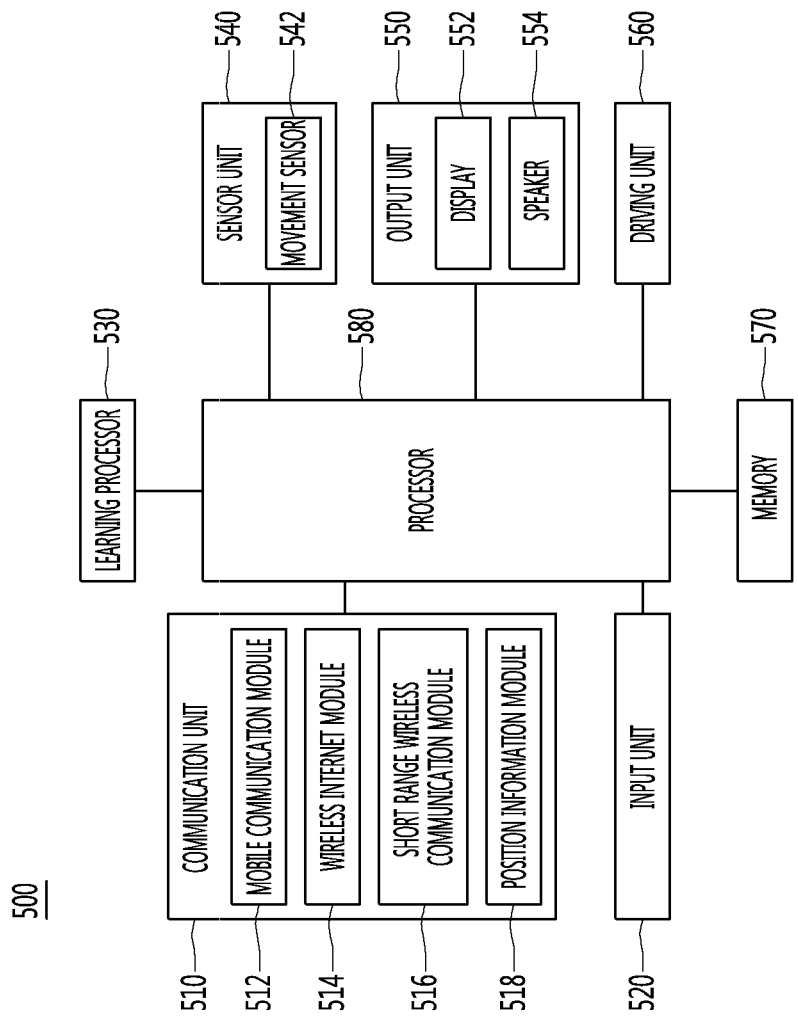
FIG. 5 is a view illustrating one embodiment of a control configuration of the IoT device shown in FIG. 4.

FIG. 5 is a view illustrating one embodiment of a control configuration of the IoT device shown in FIG. 4.

Hereinafter, for convenience of description, it will be assumed that the IoT device 500 is a personal transportation vehicle such as an electric scooter. However, the embodiments are not limited to the personal transportation vehicle, and also may be applied to various kinds of IoT devices 500.

Referring to FIG. 5, the IoT device 500 may include a communication interface 510, an input unit 520, a sensor unit 540, an output unit 550, a driving unit 560, a memory 570, and a processor 580. As described above in FIG. 4, the IoT device 500 may be an example of the AI apparatus 100 shown in FIG. 1. In other words, the same or similar descriptions with reference to FIG. 1 may be applied to configurations, among the control configurations shown in FIG. 5, corresponding to the control configurations included in the AI apparatus 100.

The communication interface 510 may include communication modules configured to connect the IoT device 500 to the server 200a, the mobile terminal 400, or another IoT device through networks. Each of the communication modules may support any one of the communication technologies described above with reference to FIG. 1.

For example, the IoT device 500 may be connected to the networks through an access point such as a router. Accordingly, the IoT device 500 may provide various information acquired through the input unit 520, the sensor unit 540, or the like to the server 200a or the like through the networks.

Meanwhile, the communication interface 510 may include a mobile communication module 512, a wireless Internet module 514, a short range wireless communication module 516, and a position information receiver 518.

The mobile communication module 512 may support various mobile communication schemes such as long term evolution (LTE) and 5G networks.

The wireless Internet module 514 may support various wireless Internet schemes, such as Wi-Fi and wireless LAN.

The short range wireless communication module 516 may support various short range wireless communication schemes such as Bluetooth and Bluetooth low energy (BLE).

The position information receiver 518 may receive position information of the IoT device 500 from a satellite or the like based on a global positioning system (GPS), a global navigation satellite system (GNSS), or the like.

For example, the IoT device 500 may transmit the state information of the IoT device 500 to the server 200a through at least one of the mobile communication module 512 or the wireless Internet module 514, or receive the control command from the server 200a.

In addition, the IoT device 500 may acquire the position information of the IoT device 500 through the wireless Internet module 514 and/or the position information receiver 518.

For example, when the IoT device 500 is positioned outdoors, the processor 580 may acquire the position information of the IoT device 500 through the position information receiver 518.

When the IoT device 500 is positioned indoors, the processor 580 may acquire the position information of the IoT device 500 through the wireless Internet module 514. For example, the processor 580 may acquire the position information of the IoT device 500 through a Wi-Fi positioning system (WPS).

Meanwhile, depending on surrounding environments or communication conditions, there may be a predetermined degree of error between a position based on the position information and an actual position of the IoT device 500.

Accordingly, the IoT device 500 may output a wireless communication signal through the wireless Internet module 514 or the short range wireless communication module 516. The mobile terminal 400 may receive the wireless communication signal outputted from the IoT device 500, and estimate the position of the IoT device 500 based on a received signal strength indicator (RSSI). The manager may move to the estimated position and retrieve the IoT device 500.

The related embodiment will be described later with reference to FIGS. 6 to 10.

The input unit 520 may include at least one input mechanism to acquire various types of data. For example, the at least one input mechanism may include a physical input mechanism such as a button or a dial, a touch input part such as a touch pad or a touch panel, and a microphone or the like configured to receive a voice of a user or a sound around the IoT device 500, and the like. The user may input various requests or commands into the IoT device 500 through the input unit 520.

The sensor unit 540 may include at least one sensor configured to sense various information around the IoT device 500.

For example, the sensor unit 540 may include a movement sensor 542 that detects a movement of the IoT device 500. The movement sensor may include an inertial measurement unit (IMU), but is not limited thereto.

When the movement sensor 542 is included, the processor 580 may detect whether the IoT device 500 is stolen by using the movement sensor 542. For example, when a movement is detected for a reference time period or more from the movement sensor (or when more than a reference amount of movement is detected) in a state where the IoT device 500 is not in use, the processor 580 may detect the IoT device 500 as stolen.

According to the embodiments, the sensor unit 540 may include a proximity sensor configured to detect an approach of an object such as a user near the IoT device 500, a speed measurement sensor configured to measure a speed of the IoT device 500, and various sensors such as an illuminance sensor configured to detect brightness of a space in which the IoT device 500 is disposed.

The output unit 550 may output various information or contents related to an operation or state of the IoT device 500, and various services, programs and applications executed in the IoT device 500, and the like. For example, the output unit 550 may include a display 552, a speaker 554, and the like.

The display 552 may output the aforementioned various information, messages, or contents into a graphic type. The speaker 554 may output the various information, messages, or contents into a voice or sound type.

The driving unit 560 is configured to move (drive) the IoT device 500, and may include, for example, a driving motor. The driving motor may be connected to at least one wheel provided at a lower portion of the IoT device 500 so as to provide a driving force for driving the IoT device 500 to the at least one wheel. For example, the driving unit 560 may have at least one driving motor, and the processor 580 may adjust the driving direction and/or the traveling speed of the IoT device 500 by controlling the at least one driving motor. According to the embodiments, when the IoT device 500 is a different kind of device other than the personal transportation vehicle, the driving unit 560 may not be provided.

The memory 570 may store various data such as control data configured to control operations of components included in the IoT device 500, and data configured to perform an operation based on an input acquired through the input unit 520 or information acquired through the sensor unit 540.

In addition, the memory 570 may store program data such as a software module or an application executed by at least one processor or a controller included in the processor 580.

The memory 570 may include various storage devices such as a ROM, a RAM, an EPROM, a flash drive, a hard drive, and the like in view of hardware.

The processor 580 may include at least one processor or controller that controls the operation of the IoT device 500. Specifically, the processor 580 may include at least one CPU, an application processor (AP), a microcomputer (or a micom), an integrated circuit, an application specific integrated circuit (ASIC), and the like.

According to the embodiments, when the IoT device 500 itself is implemented as an artificial intelligence apparatus, the IoT device 500 may include a recognition model that recognizes a normal use or abnormal use (such as theft) of the IoT device 500 based on information acquired from the communication interface 510, the input unit 520, the sensor unit 540, and the like. For example, the recognition model may include an artificial neural network constructed according to an artificial intelligence (machine learning)-based neural network.

The learning processor 530 or the processor 580 may recognize, through the recognition model, whether the IoT device 500 is normally used or abnormally used based on the acquired information.

In addition, the learning processor 530 may perform a learning operation on the recognition model by using the acquired information, so that the recognition model may be updated.

Figure 6:
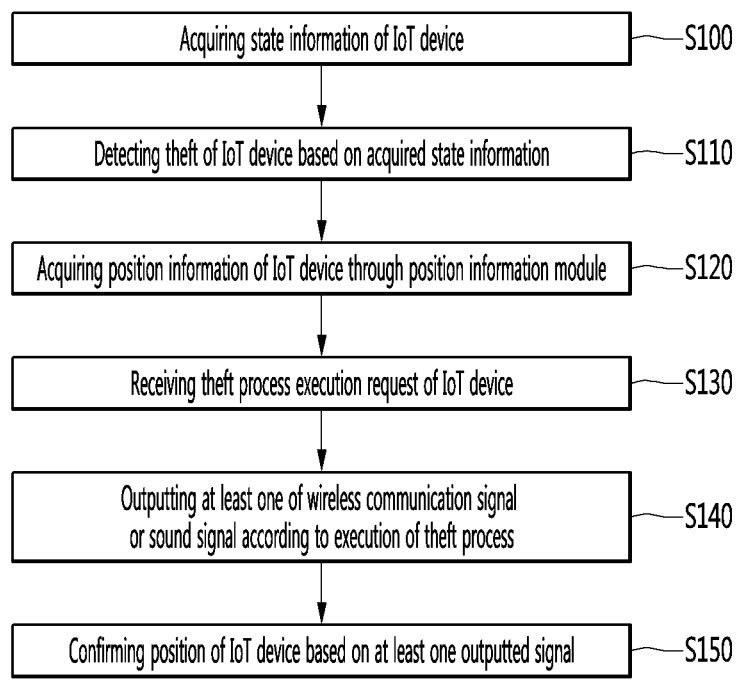
FIG. 6 is a flowchart for explaining a control operation of the system including the artificial intelligence apparatus according to the embodiments.
Figure 7:
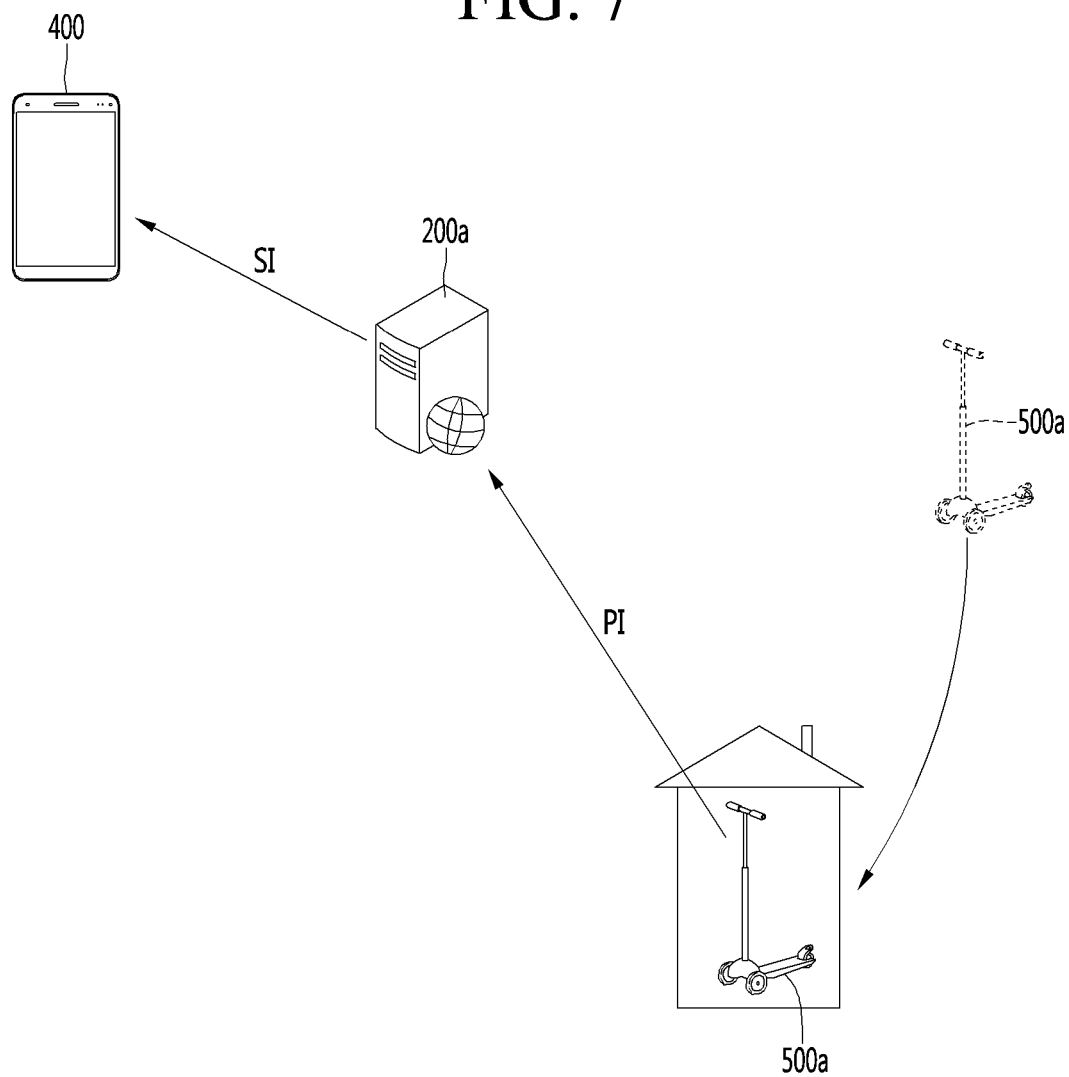
FIGS. 7 to 10 are exemplary views related to the control operation shown in FIG. 6.

FIG. 6 is a flowchart for explaining a control operation of the system including the artificial intelligence apparatus according to the embodiments. FIGS. 7 to 10 are exemplary views related to the control operation shown in FIG. 6.

In FIGS. 6 to 10, the artificial intelligence apparatus will be described in the case that the artificial intelligence apparatus is the server 200a as an example.

Referring to FIGS. 6 to 10, the server 200a may acquire state information of the IoT device 500a (S100).

The IoT device 500a may acquire the state information of the IoT device 500a through the communication interface 510, the input unit 520, the sensor unit 540, or the like. As described above in FIG. 4, the state information may include information related to a used/non-used state of the IoT device 500a, information related to a battery state, position information, various sensing information, and/or authentication information.

A processor 580 of the IoT device 500a may transmit the acquired state information to the server 200a through the communication interface 510 (such as the mobile communication module 512).

The server 200a may detect theft of the IoT device 500a based on the acquired state information (S110).

For example, a processor 260 may detect theft of the IoT device 500a by confirming, based on the state information, that a movement is detected for a reference time period or more from the movement sensor 542 in a state where the IoT device 500a is in an unused state. A scheme that enables the processor 260 to detect the theft of the IoT device 500a from the state information may be variously implemented.

Alternatively, the processor 260 may acquire a recognition result on a stolen state (or an abnormally used state) of the IoT device 500a based on the state information by using the artificial intelligence-based learned recognition model, so that the theft of the IoT device 500a may be detected.

The IoT device 500a may acquire position information of the IoT device 500a through the position information receiver 518 (S120).

When the theft of the IoT device 500a is detected, the processor 260 of the server 200a may transmit a request for providing the position information to the IoT device 500a.

The IoT device 500a may acquire the position information through the position information receiver 518 in response to the received request, and transmit the acquired position information PI to the server 200a.

According to the embodiments, the processor 260 may acquire the position information of the IoT device 500a from a Wi-Fi positioning system (WPS) server through the WPS.

Specifically, the WPS server may have a database including position information of each of Wi-Fi access points. The WPS server may generate the position information of the IoT device 500a based on each of the position information of the at least one Wi-Fi access point in which the IoT device 500a is scanned. The WPS server may transmit the generated position information to the IoT device 500a or the server 200a.

According to the embodiments, the processor 260 may acquire currently scanned MAC address information of the at least one Wi-Fi access point from the IoT device 500a, and may verify reliability of the position information of the IoT device 500a through match with the position information received from the WPS server.

The processor 260 of the server 200a may transmit search information SI including the received position information PI to the mobile terminal 400 of the user or manager.

Figure 8:
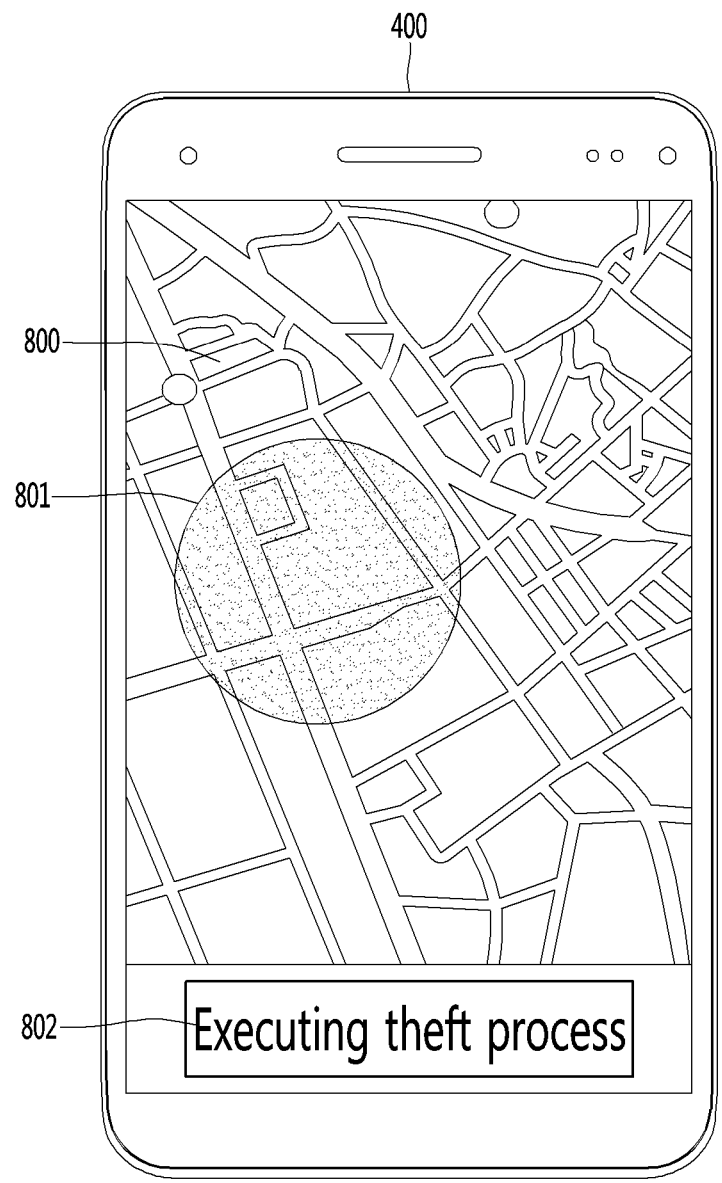

For example, as shown in FIG. 8, the mobile terminal 400 may display a map image 800 including the position information PI on the display, based on the received search information SI.

Meanwhile, the position information PI acquired through the WPS or the position information receiver 518 may generate a predetermined error depending on surrounding environments or communication states. Accordingly, the mobile terminal 400 may display the position information PI and a search range 801 taken consideration into the error on the map image 800.

However, according to the embodiments, the mobile terminal 400 may display an item indicating a point, instead of the search range 801, corresponding to the position information PI on the map image 800.

In addition, the mobile terminal 400 may display an item 802 (such as a virtual button) for receiving a theft process execution request of the IoT device 500a from the user or manager.

The server 200a may receive the theft process execution request of the IoT device 500a from the mobile terminal 400 (S130).

Figure 9:
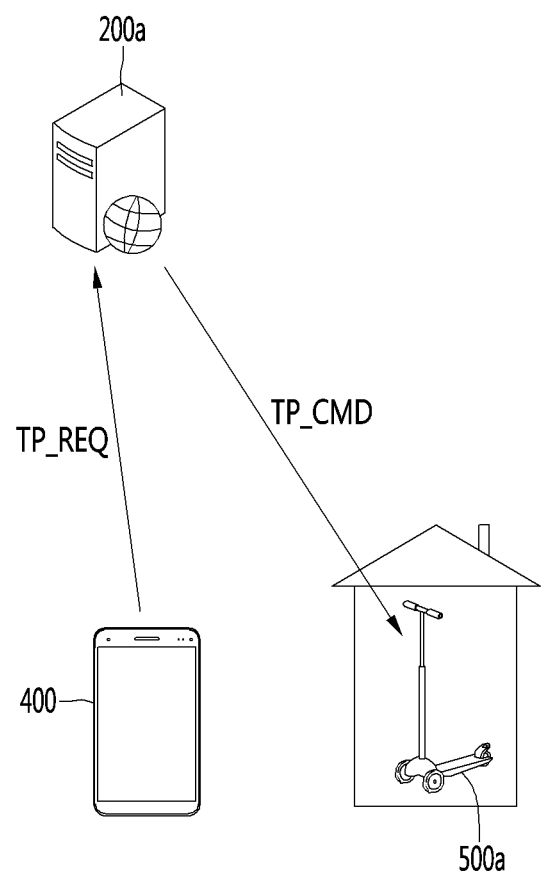

Referring to FIGS. 8 and 9, for example, the user or manager may move to a point within or near the search range 801, and then select the item 802 for the theft process execution request displayed on the display of the mobile terminal 400.

The mobile terminal 400 may transmit the theft process execution request TP_REQ to the server 200a in response to the selection of the item 802.

The processor 260 of the server 200a may transmit a theft process execution command TP_CMD to the IoT device 500a in response to the received theft process execution request TP_REQ.

According to the embodiments, when detecting that the mobile terminal 400 and the IoT device 500a are positioned within a predetermined distance based on the position information of the mobile terminal 400 and the position information of the IoT device 500a the processor 260 may automatically transmit the theft process execution command TP_CMD.

The IoT device 500a may output at least one of a wireless communication signal or a sound signal according to the execution of the theft process (S140), and the position of the IoT device 500a may be confirmed based on the at least one output signal (S150).

Figure 10:
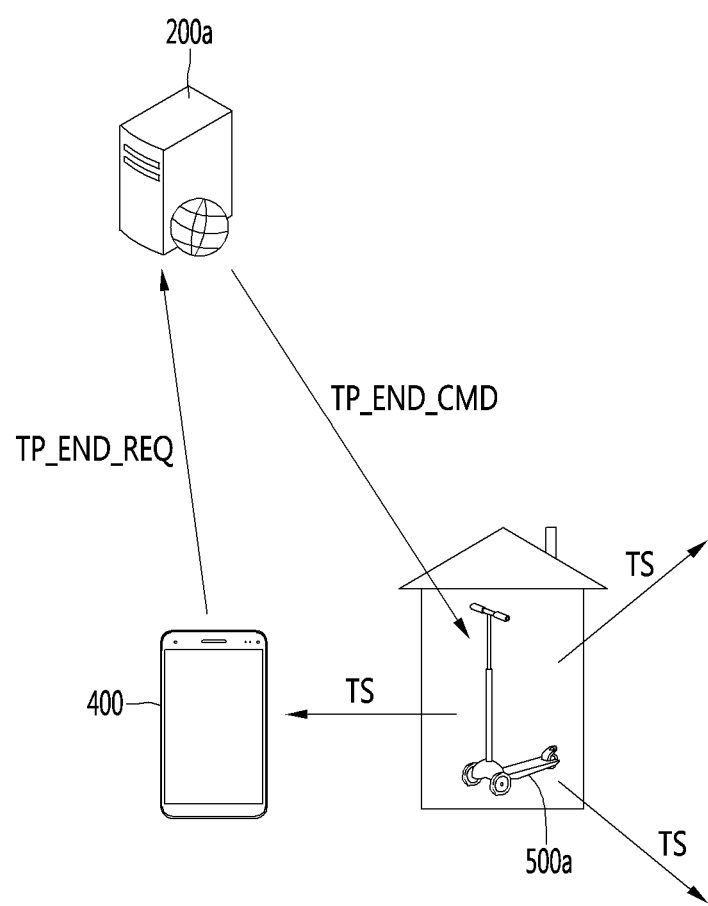

Referring to FIG. 10 together, the processor 580 of the IoT device 500a may execute the theft process in response to the received command TP_CMD.

For example, the theft process may refer to a process of outputting a wireless communication signal and/or a sound signal for allowing the mobile terminal 400 or the manager (user) to recognize an accurate position of the IoT device 500a.

The processor 580 may output a theft signal TS in the form of a wireless communication signal through the wireless Internet module 514 or the short range wireless communication module 516. For example, the wireless communication signal may be a broadcast signal.

For example, the processor 580 may broadcast a signal for searching for a peripheral device by switching a mode of a Wi-Fi module of the wireless Internet module 514 into a softAP mode. Alternatively, the processor 580 may broadcast a signal for searching for a peripheral device by setting a BLE module of the short range wireless communication module 516 into an advertise mode.

The mobile terminal 400 may receive the broadcast theft signal TS and estimate the position of the IoT device 500a based on the received signal strength indicator (RSSI) of the theft signal TS.

The processor 580 may output the theft signal TS in the form of a sound through the speaker 554. The mobile terminal 400 may receive the theft signal TS through the microphone, and estimate the position of the IoT device 500a based on a sound level of the received theft signal TS. Alternatively, the manager or user may directly listen to the theft signal TS in the form of sound and estimate the position of the IoT device 500a.

When the manager or user retrieves the IoT device 500a based on the theft signal TS, the manager or user may transmit a theft process end request TP_END_REQ to the server 200a by manipulating the mobile terminal 400.

The server 200a may transmit a theft process end command TP_END_CMD to the IoT device 500a in response to the theft process end request TP_END_REQ. The IoT device 500a may terminate the output of the theft signal TS by terminating the theft process in response to the received command.

In other words, according to the embodiments shown in FIGS. 6 to 10, the system may provide the approximate position information of the theft-detected IoT device 500, and then output the signal for estimating the position more accurately through the theft process of the IoT device 500. Accordingly, the recovery rate for the stolen or lost IoT device 500 may be improved.

Figure 11:
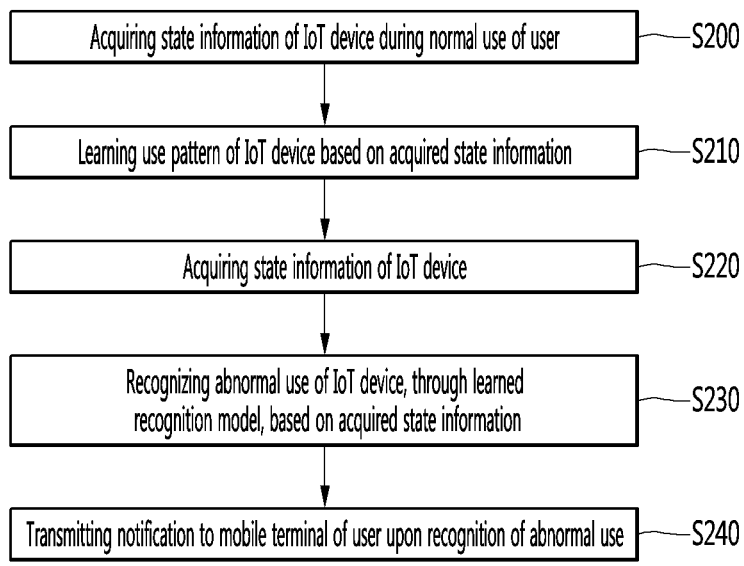
FIG. 11 is a flowchart for explaining a method of enabling the artificial intelligence apparatus according to the embodiments to recognize a situation on an abnormal use such as theft of the IoT device.

FIG. 11 is a flowchart for explaining a method of enabling the artificial intelligence apparatus according to the embodiments to recognize an abnormal use situation such as theft of the IoT device.

Referring to FIG. 11, the artificial intelligence apparatus (such as the server 200a) may acquire the state information of the IoT device 500 during normal use of the user (S200), and may learn a use pattern of the IoT device 500 based on the acquired state information (S210).

The normal use of the user may denote a use after a request for using the IoT device 500 is approved, denote a use of the IoT device 500 according to an input by a registered user, or denote a use of the IoT device 500 when the mobile terminal 400 of the user and the IoT device 500 are positioned within a predetermined distance.

The processor 260 of the server 200a may receive the state information from the IoT device 500 during the normal use of the user. The processor 260 or the learning processor 240 may learn the use pattern during normal use of the IoT device 500 based on the received state information.

The server 200a may include a recognition model trained and established based on the artificial intelligence. The recognition model may include a normal/abnormal use recognizer configured to recognize a normal or abnormal use of the IoT device 500 based on the state information of the IoT device 500. For example, the normal/abnormal use recognizer may be provided in the form of a deep learning-based artificial neural network, but is not limited thereto.

The artificial intelligence apparatus may acquire the state information of the IoT device 500 (S220), and recognize the abnormal use of the IoT device 500, through the learned recognition model, based on the acquired state information (S230).

The processor 260 may input the state information acquired from the IoT device 500 to the recognition model, and acquire a recognition result, which indicates whether the use state of the IoT device 500 corresponds to the normal use or abnormal use, from the recognition model.

The normal use may refer to a state in which the IoT device 500 is used by an authorized or registered user. Whereas, the abnormal use may be a state in which the IoT device 500 is used by another person who is not authorized or registered, and may refer to the theft or loss.

According to the embodiments, the processor 260 or the learning processor 240 may train the learning of the recognition model by using the state information recognized as the abnormal use, so that a recognition accuracy for abnormal use can be improved.

The artificial intelligence apparatus, upon recognition of the abnormal use, may transmit a notification indicating the abnormal use of the IoT device 500 to the mobile terminal 400 of the user (or manager) (S240).

According to the embodiments, upon recognition of the abnormal use, the system may perform an operation for retrieving the stolen IoT device 500 as described above in steps S120 to S150 of FIG. 6.

Figure 12:
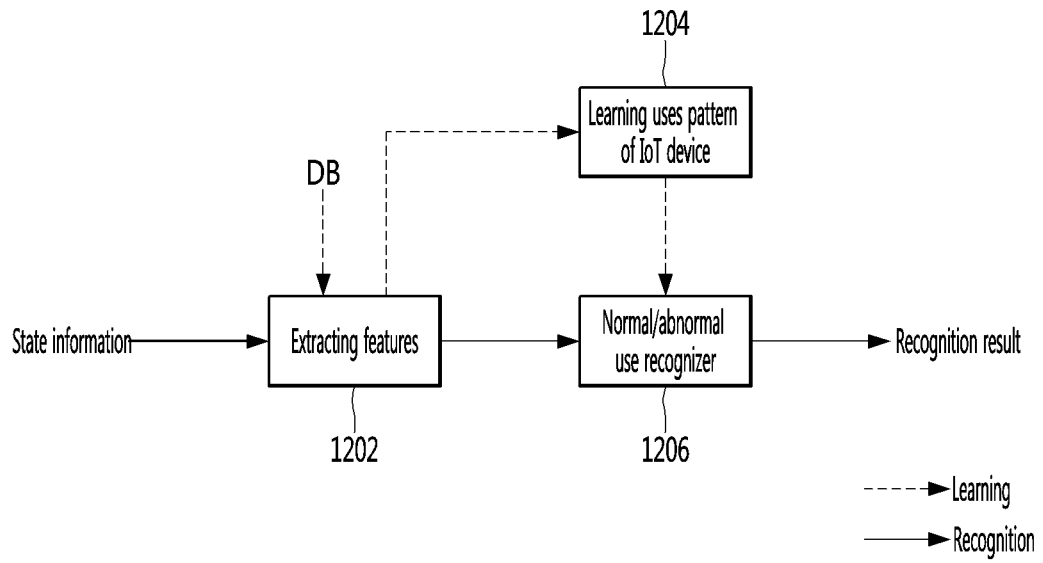
FIG. 12 is a view for explaining a learning operation and a recognition operation of a normal/abnormal use recognizer included in a recognition model of the artificial intelligence apparatus according to the embodiments.

FIG. 12 is a view for explaining a learning operation and a recognition operation of a normal/abnormal use recognizer included in a recognition model of the artificial intelligence apparatus according to the embodiments.

Referring to FIG. 12, the processor 260 of the artificial intelligence apparatus (such as the server 200a) may perform a recognition operation of extracting at least one feature point from the received state information when the status information is received from the IoT device 500 (1202); and recognizing the normal use or abnormal use of the IoT device 500 based on the extracted feature point (1206) and outputting a recognition result (normal use or abnormal use). For example, the recognition model may output probability values for the normal use and the abnormal use, and the processor 260 may acquire an item having a high probability value as the recognition result.

According to the embodiments, the processor 260 may perform the recognition operation by using the normal/abnormal use recognizer, based on the received state information itself.

According to the embodiments, although the processor 260 may output a single recognition result as a final recognition result, a plurality of recognition operations may be performed to output a final recognition result based on the recognition results, so that the recognition accuracy can be improved.

Meanwhile, the learning processor 240 may perform a learning operation on the normal/abnormal use recognizer included in the recognition model.

For example, the learning processor 240 may establish a database by collecting a plurality of state information, and perform the learning 1204 of the normal/abnormal use recognizer by using the feature points extracted from the acquired state information and the recognition result of the normal/abnormal use recognizer. Parameters (such as weight and/or bias) of the neural network included in the normal/abnormal use recognizer may be updated through the learning 1204. When the number of times of learning increases, the recognition accuracy of the recognition model can be improved.

In other words, according to the embodiments shown in FIGS. 11 and 12, the artificial intelligence apparatus may recognize a state of the abnormal use for the IoT device 500 more accurately by training the recognition model based on the state information of the IoT device 500. Accordingly, the theft or loss of the IoT device 500 may be accurately recognized in various situations, and thus the safe management for the IoT 500 device can be implemented.

According to the embodiments, after providing approximate position information of the theft-detected IoT device, the artificial intelligence apparatus may acquire a signal for estimating a more accurate position by controlling the theft process of the IoT device. Accordingly, the return rate for stolen or lost IoT devices can be effectively improved.

In addition, the artificial intelligence apparatus may learn the recognition model based on the state information of the IoT device, so that a situation on an abnormal use for the IoT device can be recognized more accurately. Accordingly, the theft or loss of the IoT device may be accurately recognized in various situations, so that the safe management for the IoT device can be implemented.

The above descriptions are merely illustrative of the technical idea of the present disclosure, and it will be apparent that a person having ordinary skill in the art may carry out various deformations and modifications within the scope without departing from inherent features of the present disclosure.

Therefore, the embodiments disclosed in the present disclosure are intended to not limit but illustrate the technical idea of the present disclosure, so the scope of the technical idea of the present disclosure is not limited by those embodiments.

The protection scope of the present disclosure should be understood according to the following claims, and all technical ideas within the scope of equivalents should be construed as falling within the scope of the present disclosure.

What is claimed is:

1. An artificial intelligence apparatus comprising:
a communication interface configured to acquire position information of the artificial intelligence apparatus;
at least one sensor configured to acquire state information of the artificial intelligence apparatus;
a speaker; and
a processor configured to:
detect whether the artificial intelligence apparatus is stolen based on the acquired state information,
transmit the position information of the artificial intelligence apparatus to a server when theft of the artificial intelligence apparatus is detected,
receive a theft process execution command from the server, and
control at least one of the communication interface or the speaker to output at least one of a wireless communication signal or a sound signal, based on the received theft process execution command, wherein the communication interface includes a BLE (Bluetooth Low Energy) module, and the processor switches a mode of the BLE module into an advertise mode to broadcast the wireless communication signal for recognizing the position information to a peripheral device, in response to the theft process execution command.

2. The artificial intelligence apparatus according to claim 1, further comprising a memory configured to store a recognition model that recognizes whether the artificial intelligence apparatus is normally used based on the state information of the artificial intelligence apparatus, and wherein the processor recognizes whether the artificial intelligence apparatus is stolen based on the received state information by using the recognition model.

3. The artificial intelligence apparatus according to claim 2, further comprising a learning processor configured to update the recognition model by using the state information of the artificial intelligence apparatus and a recognition result of the recognition model.

4. The artificial intelligence apparatus according to claim 1, wherein the at least one sensor includes a movement sensor, and the processor detects theft of the artificial intelligence apparatus when a movement is detected for a reference time period or more through the movement sensor in a non-use state of the artificial intelligence apparatus.

5. The artificial intelligence apparatus according to claim 1, wherein the communication interface further includes a Wi-Fi module, and the processor switches a mode of the Wi-Fi module into a softAP mode to broadcast the wireless communication signal, in response to the theft process execution command.

* * * * *